March 13, 1962

R. M. MILTON 3,024,868

PURIFICATION OF REFORMER HYDROGEN BY ADSORPTION

Filed Nov. 30, 1959

INVENTOR.
ROBERT M. MILTON
BY *William F. Mesinger*
ATTORNEY.

:::
United States Patent Office 3,024,868
Patented Mar. 13, 1962

---

3,024,868
PURIFICATION OF REFORMER HYDROGEN BY ADSORPTION
Robert M. Milton, Buffalo, N.Y., assignor to Union Carbide Corporation, a corporation of New York
Filed Nov. 30, 1959, Ser. No. 856,281
18 Claims. (Cl. 183—114.2)

This invention relates to the purification of reformer hydrogen, and more specifically relates to an improved method for removing impurities such as moisture and sulfur-containing compounds from a reformer recycle hydrogen gas stream.

In the reforming of hydrocarbon oils with a metal oxide dehydrogenation catalyst in the presence of recycled product gas rich in hydrogen, the activity of the catalyst is adversely affected by moisture and sulfur-containing compounds. Since the recycled product gas, referred hereinafter as reformer hydrogen, contains moisture and sometimes a prohibitively high concentration of sulfur compounds, the prior art has proposed and employed numerous methods for removing these impurities. Unfortunately all of the prior art schemes have serious limitations and drawbacks.

Reformer hydrogen usually contains more than 50% hydrogen as the major constituent, but under some conditions where the net production of hydrogen is low it may fall to about 35% by volume. The remainder of the reformer hydrogen stream is paraffinic hydrocarbons ranging from $C_1$ to $C_9$.

The prior art has employed desiccants such as silica gel and activated alumina to dry reformer hydrogen. These methods of dehydration have among their disadvantages, low water capacity at low vapor pressures, low water capacity at elevated temperatures, and coadsorption of hydrocarbons thereby lowering the capacity of the desiccant for water. Furthermore, desorption of the coadsorbed hydrocarbons by heat causes extensive coking thereby shortening the life of the desiccant.

When the reformer hydrogen also contains sulfur compounds such as hydrogen sulfide and mercaptans in objectionable concentrations, the prior art has of necessity employed a two-step arrangement to remove the impurities. Thus, moisture was removed by desiccants and sulfur compounds by for example ethanolamine scrubbing. Furthermore, under normal conditions the amine system will only reduce the effluent $H_2S$ concentration to approximately 0.25–1.0 grains $H_2S$ per 100 s.c.f. gas. In many reformer hydrogen purification systems, this is equal to or very close to the inlet $H_2S$ concentrations. Consequently the amine system is ineffectual in such cases.

A principal object of this invention is to provide an improved method for removing moisture from a reformer hydrogen stream.

Another object is to provide an improved method for removing sulfur-containing compounds from a reformer hydrogen stream.

A further object is to provide an improved method for removing moisture and sulfur-containing compounds from a reformer hydrocarbon stream in a single step.

Still another object is to provide an improved method for removing moisture and sulfur-containing compounds from a reformer hydrocarbon stream in a single adsorption step, without coadsorbing paraffinic hydrocarbons.

These and other objects and advantages of this invention will be apparent from the following description and accompanying drawings in which.

Figure 1:
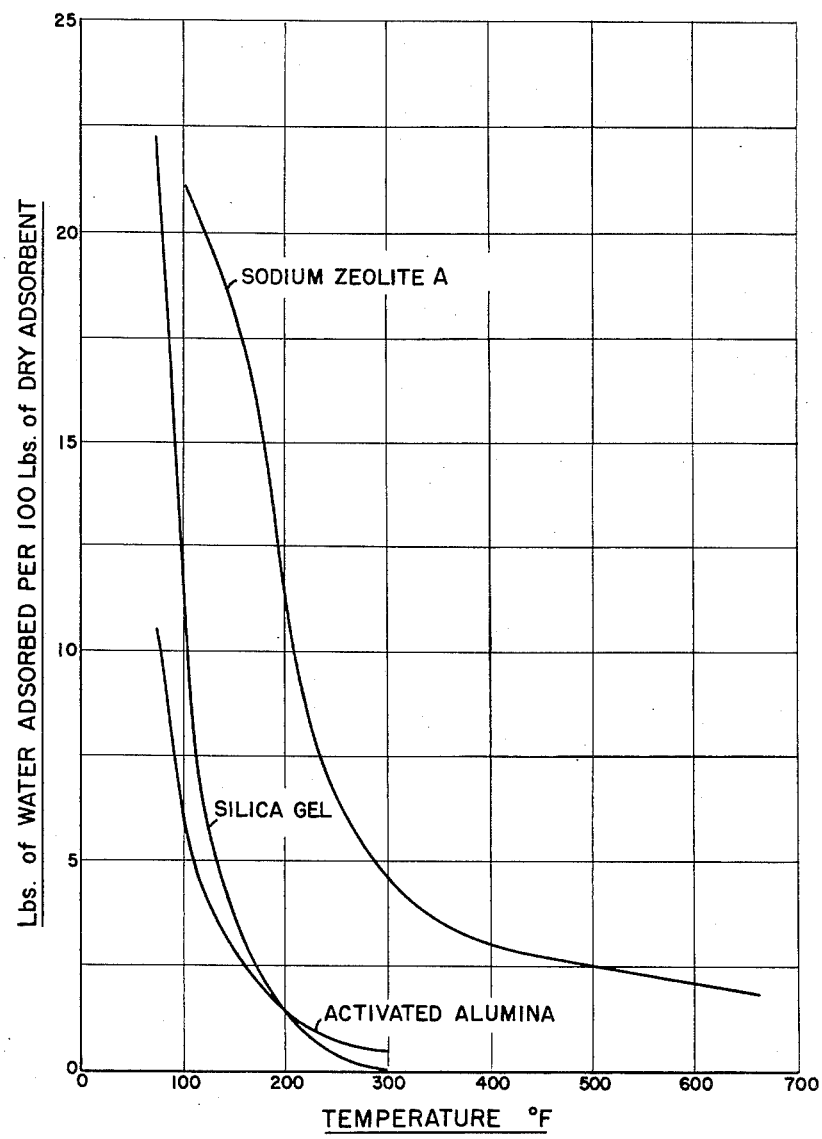
FIG. 1 is a graph comparing the water adsorptive capacity of sodium zeolite A with conventional desiccants at elevated adsorption temperatures.

This invention provides a method for purifying a moisture-containing reformer recycle hydrogen gas stream wherein a bed of crystalline zeolitic molecular sieve material is provided having pore sizes less than about 4 angstroms. A moisture-containing reformer hydrogen gas feed stream is contacted with the zeolitic molecular sieve bed, thereby adsorbing at least most of the moisture. A moisture-depleted reformer hydrogen gas stream is then discharged from the bed.

The term "zeolite," in general, refers to a group of naturally occurring and synthetic hydrated metal aluminosilicates, many of which are crystalline in structure. There are, however, significant differences between the various synthetic and natural materials in chemical composition, crystal structure and physical properties such as X-ray powder diffraction patterns.

The structure of crystalline zeolite molecular sieves may be described as an open three-dimensional framework of $SiO_4$ and $AlO_4$ tetrahedra. The tetrahedra are crosslinked by the sharing of oxygen atoms, so that the ratio of oxygen atoms to the total of the aluminum and silicon atoms is equal to two, or $O/(Al+Si)=2$. The negative electro-valence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of adsorbate molecules. This space is then available for adsorption of molecules having a size, shape and energy which permits entry of the adsorbate molecules into the pores of the molecular sieves.

The present invention is predicated on the discovery that water and sulfur-containing compounds are sorbed to the substantial exclusion of saturated paraffinic hydrocarbons on crystalline zeolitic molecular sieve material having a pore size less than about 4 angstrom units. To one skilled in the use of molecular sieve zeolite adsorbents, the more polar nature of water and hydrogen sulfide as compared to hydrogen and saturated hydrocarbons would suggest that any molecular sieve zeolite having pore openings large enough to accept the hydrogen sulfide molecule, about 3.6 angstron units, could be employed. This is due to the fact that crystalline zeolites exhibit a strong preference for molecules that are polar in nature. The remarkable performance of crystalline zeolites having pore sizes less than about 4 angstroms is even more amazing when one considers that such zeolites are known to adsorb the paraffins methane, ethane and propane, and these are present in appreciable concentrations in the reformer hydrogen. Larger pore sized molecular sieves such as zeolite 5A (calcium zeolite A) and zeolite 13X are known to adsorb these compounds and their higher weight homologs, but the relative amounts of such higher molecular weight materials in the feed stream would seem so low that their effect would be overlooked.

Contrary to these expectations, it has been discovered that molecular sieves having pore sizes larger than about 4 angstroms strongly adsorb and concentrate the $C_4$ and higher paraffins. The domination of the adsorption areas of the molecular sieves by these higher paraffins effectively limits the ability of the larger pore size zeolites to adsorb the sulfur compounds from a reformer hydrogen stream and in all probability accounts for the superiority of the smaller pore sized zeolites.

The zeolites occur as agglomerates of fine crystals or are synthesized as fine powders and are preferably tableted or pelletized for large scale adsorption uses. Pelletizing methods are known which are very satisfactory because the sorptive character of the zeolite, both with regard to selectivity and capacity, remains essentially unchanged.

It is to be understood that the expression "pore size," as used herein refers to the apparent pore size, as distinguished from the effective pore diameter. The apparent pore size may be defined as the maximum critical dimension of the molecular species which is adsorbed by the zeolitic molecular sieve in question, under normal conditions. Maximum critical dimension may be defined as the diameter of the smallest cylinder which will accommodate a model of the molecule constructed using the best available values of bond distances, bond angles, and Van der Waal radii. Effective pore diameter is defined as the free diameter of the appropriate silicate ring in the zeolite structure. The apparent pore size for a given zeolitic molecular sieve will always be larger than the effective pore diameter.

In the present method for removing both water and hydrogen sulfide from reformer hydrogen, the naturally occurring zeolitic molecular sieves which may be employed are chabazite, gmelinite and mordenite. These are adequately described in the chemical art. The suitable synthetic zeolitic molecular sieves include types A, D, R, S and T. These are preferably employed in their sodium-rich cation form although they may contain some other mono- or divalent cations provided that such cation substitution does not alter the effective pore size of the zeolite so that it falls outside the range of about 3.6 to 4.0 angstrom units.. Potassium cations have the effect of decreasing the effective pore size below this value and to the extent which they are present, the capacity of the adsorbent for hydrogen sulfide will be reduced. Divalent cations, exemplified by calcium, have the effect of enlarging the pore size when they are present in substantial quantities. In the preferred zeolitic molecular sieve type A, this enlargement does not occur until more than about 25 percent of the cation sites are satisfied by divalent calcium cations. Strontium and magnesium cations have been found to exhibit this same phenomenon.

When it is unnecessary to provide for the removal of hydrogen sulfide from the reformer hydrogen, as in those instances where the hydrocarbon feed to the reformer has been specially purified or otherwise does not contain sulfur compounds, the purification can be effected using naturally occurring or synthetic zeolitic molecular sieves having an effective pore size less than about 4 angstroms and even smaller than 3.6 angstroms. Suitable naturally occurring materials include erionite, chabazite, gmelinite, mordenite, analcite, harmatome and phillipsite. Among the synthetic zeolitic molecular sieves which may be employed are: Type A in the monovalent cation forms and in which divalent cations may be present up to about the same 25 percent substitution described above, Types D, R, S, T, F, M, J and H.

Zeolite A is a crystalline zeolitic molecular sieve which may be represented by the formula:

$$1.0 \pm 0.2 M_{\frac{2}{n}}O : Al_2O_3 : 1.85 \pm 0.5 \, SiO_2 : YH_2O$$

wherein M represents a metal, $n$ is the valence of M, and Y may have any value up to about 6. The as-synthesized zeolite A contains primarily sodium ions and is designated sodium zeolite A. Zeolite A is described in more detail in U.S. Patent No. 2,882,243 issued April 14, 1959.

Zeolite D is a crystalline zeolitic molecular sieve which is synthesized from an aqueous aluminosilicate solution containing a mixture of both sodium and potassium cations. In the as-synthesized state, zeolite D has the chemical formula:

$$0.9 \pm 0.2[xNa_2O:(1-x)K_2O]:Al_2O_3:wSiO_2:yH_2O$$

wherein "$x$" is a value from zero to 1, "$w$" is from about 4.5 to 4.9 and "$y$" in the fully hydrated form is about 7. Further characterization of zeolite D by means of X-ray diffraction techniques is described in copending application Serial No. 680,383, filed August 26, 1957. The preparative conditions for zeolite D and its ion-exchanged derivatives and their molecular sieving properties are also described therein.

Zeolite T is a synthetic crystalline zeolitic molecular sieve whose composition may be expressed in terms of oxide mole ratios as follows:

$$1.1 \pm 0.4[xNa_2O:(1-x)K_2O]:Al_2O_3:6.9 \pm 0.5SiO_2:yH_2O$$

wherein "$x$" is any value from about 0.1 to about 0.8 and "$y$" is any value from about zero to about 8. Further characterization of zeolite T by means of X-ray diffraction techniques is described in copending application Serial No. 733,819, filed May 8, 1958, now Patent No. 2,950,952, issued August 30, 1960.

Zeolite R is described and claimed in U.S. patent application Serial No. 680,381, filed August 26, 1957.

Zeolite S is described and claimed in U.S. patent application Serial No. 724,843, filed March 31, 1958.

Zeolite F is described and claimed in U.S. patent application Serial No. 681,908, filed September 4, 1957.

Zeolite J is described and claimed in U.S. patent application Serial No. 684,843, filed September 19, 1957.

Zeolite H is described and claimed in U.S. patent application Serial No. 700,736, filed December 5, 1957.

Zeolite M is described and claimed in U.S. patent application Serial No. 685,089, filed September 20, 1957.

The crystalline molecular sieve sodium zeolite A has been found particularly useful in the method of the present invention, and the latter will be described in detail with respect to sodium zeolite A. It is to be understood, however, that the invention is equally applicable to the other previously discussed zeolites. Sodium zeolite A has a pore size of about 4 angstroms, and is preferred since it substantially excludes all normal paraffins larger than propane and has a larger internal adsorption area than any other known molecular sieve zeolite of comparable pore size.

The pressure employed for the adsorption should be greater than about 200 p.s.i.g., since the actual loading of water and sulfur compounds on the adsorbent will be prohibitively low at lower pressures. The higher the total pressure employed during the present gas purification method, the higher will be the actual loading of water and sulfur compounds in the molecular sieve adsorbent. Reformer hydrogen gas streams are commonly provided in the range of 200 to 1,000 p.s.i.g. and most frequently in the range of 300 to 600 p.s.i.g.

The adsorption temperature should be as low as practical to produce the lowest effluent dew point and the highest purity with respect to sulfur compounds. Since the reformer hydrogen gas stream is normally provided in the range of 40 to 150° F., this range may be employed. The range of 40 to 100° F. is preferred to minimize the concentration of higher boiling hydrocarbons which effect a deactivation of the adsorbent upon heating and also to eliminate water-icing difficulties.

The moisture content of the reformer hydrogen feed stream may vary from as high as saturation to much lower values in some situations, as for example where the hydrocarbon feed stream to the reformer reactor has been specially dried. Due to the fact that any water and sulfur compounds entering the reforming process will tend to accumulate in the reformer recycle hydrogen feed stream, it is more effective to remove it there than at any other point in the system. The high capacity of the present molecular sieve adsorbents for water even at very low relative humidities makes them particularly well-suited to the removal of water and sulfur compounds, even in those installations where the hydrocarbons feed to the reformer is predried.

In practicing the invention, it has been found that the superficial linear gas velocity of the reformer hydrogen through the zeolitic molecular sieve bed may be any value up to about 1.5 ft. per second. The adsorption front velocity is not greatly affected by such velocity but higher velocities should be avoided since they cause undesirably high pressure drop through the molecular sieve bed.

As previously discussed, conventional desiccants such as alumina and silica gel are very sensitive to changes in gas temperatures and suffer an appreciable reduction in drying efficiency at temperatures above 100° F. The present molecular sieves, however, have extremely high capacity for water up to about 150° F. This property is clearly illustrated in FIG. 1, which is a plot of the amount of water adsorption per pound of dry adsorbent versus the adsorption temperature at a vapor pressure of 10 mm. Hg for sodium zeolite A, silica gel, and activated alumina.

Additional evidence of the suitability of the present zeolitic molecular sieves to high temperature drying of reformer hydrogen was shown in a dynamic system where the breakthrough capacity of sodium zeolite A was decreased only 33% when the temperature of the gas was increased from 75 to 212° F. Both silica gel and alumina were found to be ineffective as desiccants at 212° F.

Figure 2:
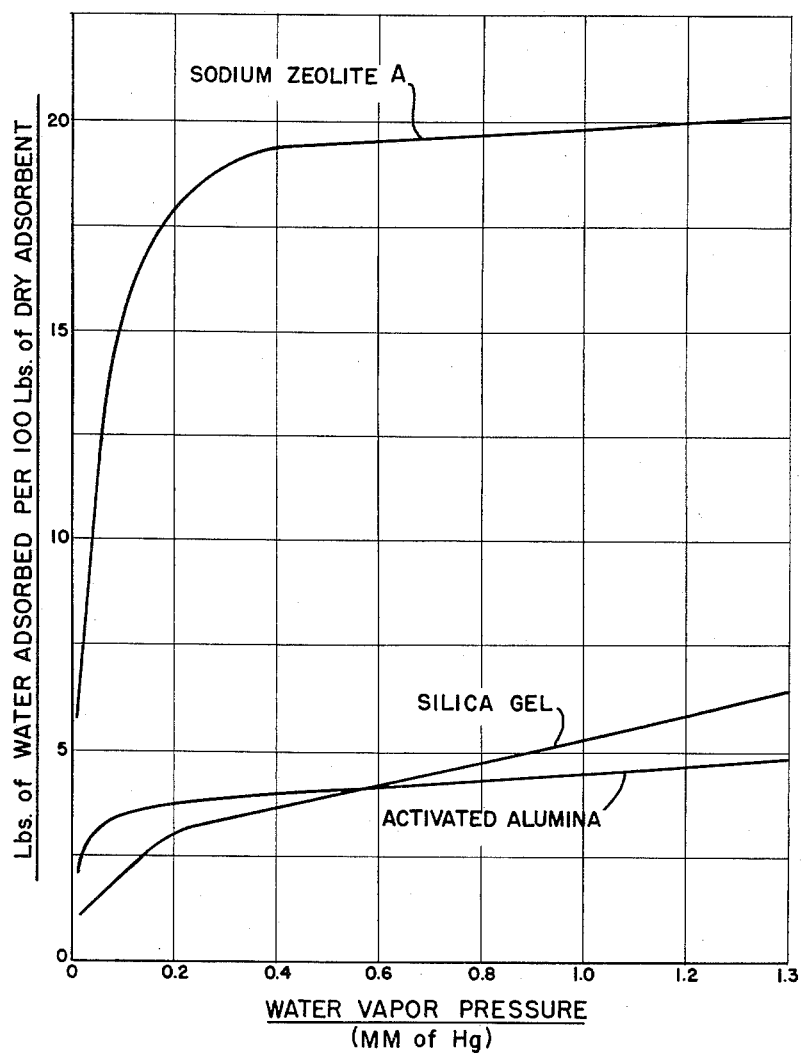
FIG. 2 is a graph comparing the water adsorptive capacity of sodium zeolite A with conventional desiccants at low vapor pressures.

The water capacity of activated alumina and silica gel is appreciably affected by the partial pressure or relative humidity. In contrast, the present molecular sieves have essentially the same capacity at 4.0 mm. Hg as 25 mm. Hg water pressure. This property illustrated in FIG. 2, which is a plot of the amount of water adsorption per pound of dry adsorbent at 25° C., versus water vapor pressure, for sodium zeolite A, silica gel, and activated alumina. Additional evidence of the reduced sensitivity of the present zeolitic molecular sieves to changes in relative humidity was shown in a dynamic system where the breakthrough capacity of sodium zeolite A at 7% and 80% relative humidity was about the same.

When sulfur-containing compounds such as hydrogen sulfide and mercaptans are also present in the reformer hydrogen feed gas, the present invention provides a method for removing moisture and such sulfur compounds in one step instead of the multiple steps required by the prior art schemes. That is, crystalline zeolitic molecular sieves having pore sizes between about 3.6 and 4.0 angstroms are capable of simultaneously adsorbing these impurities and at the same time excluding most of the paraffinic hydrocarbons which would otherwise provide competition at the adsorption sites, and when heated effect a deactivation of the molecular sieve.

When a feed gas containing two adsorbable components is fed to a bed of the present zeolitic molecular sieve material, adsorption usually occurs in a series of steady state mass transfer fronts or waves. These fronts form at the feed end of the bed and progress through the bed at different constant velocities. The more strongly held materials will be concentrated towards the feed end of the bed. In the case of reformer hydrogen purification, there are two principal adsorbable components, $H_2O$ and $H_2S$. They will be adsorbed on the bed in this order of preference, and the water will displace essentially all of the $H_2S$ from a portion of the bed in which it is adsorbed.

As previously discussed, crystalline zeolitic molecular sieves having pore sizes less than about 4 angstroms afford unexpected advantages when compared to molecular sieves of larger pore sizes, for the present gas purification method. This fact was vividly illustrated in a series of tests using a 1½ inch SCH. 40 x 6 ft. stainless steel pipe section as the adsorption tower. The reformer hydrogen feed stream contained 86 mol-percent hydrogen and the balance $C_1$ through $C_5$ paraffinic hydrocarbons. Four runs were made, two using sodium zeolite A (4A), ⅟₁₆ inch pellets and one each using calcium zeolite (5A) and sodium zeolite X (13X), ⅟₁₆ inch pellets. In these designations the number refers to the approximate pore size and the letter refers to the type of synthetic crystalline zeolitic molecular sieve, zeolite X being described and claimed in U.S. Patent No. 2,882,244 issued April 14, 1959. Table I is a summary of the results of these four runs.

Table I

| Molecular Sieve Type, ⅟₁₆ in. Pellets | 5A | 13X | 4A | 4A |
|---|---|---|---|---|
| Run No. | 1 | 2 | 3 | 4 |
| Superficial Linear Velocity ft./sec. | 0.85 | 0.85 | 0.85 | 0.43 |
| System Pressure p.s.i.g. | 575 | 575 | 575 | 575 |
| Gas Temperature, °F. | 88 | 88 | 88 | 88 |
| Inlet $H_2S$ Concentration, Grs./100 s.c.f.[1] | 0.9 | 0.9 | 0.65 | 0.83 |
| Maximum Effluent $H_2S$ Concentration Grs./100 s.c.f. | 0.02 | 0.02 | 0.02 | 0.02 |
| Useful $H_2S$ Capacity—wt.-percent | 0.15 | 0.21 | 1.3 | 1.4 |

[1] Analysis indicated that approximately 30% of the total inlet sulfur concentration was mercaptans. However, because of inability to determine specific mercaptans, analysis was calculated as if it were all $H_2S$.

In all of the above runs the inlet water concentration was 0.5 lbs. $H_2O$ per mm. s.c.f. It was not possible, however, to obtain any weight increase, using the gravimetric method, on the effluent stream up to the $H_2S$ breakthrough point. It can be seen from Table I that the zeolite 4A has eight to ten times greater useful capacity than the types 5A and 13X. As previously discussed, this is due to the exclusion by zeolite 4A of substances whose molecular dimension are larger than about 4 angstroms. In the present purification method, as the $H_2S$ adsorption zone moves through the bed, the $H_2S$ being adsorbed must displace whatever hydrocarbons are adsorbed thereon. In using zeolite 4A, only methane, ethane and very little propane are adsorbed; when employing larger pore sized zeolites as for example type 5A, methane, ethane, propane, butane, pentane and heavier paraffins are adsorbed. This point is illustrated by Table II, which shows the equilibrium capacities of type 4A and 5A zeolites for some of the paraffinic hydrocarbons. These capacities are at 25° C. and an adsorbate partial pressure of 500 mm. Hg. The exclusion properties of zeolite 4A are clearly shown in the table.

Table II

| Hydrocarbon | Equilibrium Capacity—Wt. percent At 25° C.—500 mm. Hg | |
|---|---|---|
| | Type 5A | Type 4A |
| Ethane | 6.5 | 5.7 |
| Propane | 10.0 | 0.1 |
| Pentane | 12.0 | 0.0 |
| Heptane | 13.0 | 0.0 |

As further proof of this heavier paraffin hydrocarbon exclusion principle, the molecular sieve beds used in runs 1 and 3 of Table I were desorbed and the desorbate cold trapped for chromatographic analysis. Table III tabulates the chromatographic analysis of the desorbed materials.

Table III

| Component | Mol, percent | |
|---|---|---|
| | Zeolite 5A | Zeolite 4A |
| Methane | 13.14 | 30.1 |
| Ethane | 1.12 | 52.2 |
| Propane | 13.90 | 15.0 |
| Butane | 18.56 | 1.21 |
| Pentane | 48.00 | 0.26 |
| 2,2-Dimethyl Butane | 0.07 | |
| 2-Methyl Pentane | 0.16 | 0.20 |
| n-Hexane | 5.30 | 0.18 |

It will be noted that methane and ethane represent 82% of the zeolite 4A 1/16 inch bed desorbate and only 13% of the zeolite 5A, 1/16 inch bed desorbate. Butane, pentane and hexane, however, represent 72% of the zeolite 5A desorbate and less than 2.0% of the 4A desorbate. This, of course, is due to the exclusion of butane, pentane and hexane by zeolite 4A.

The data presented in Tables I–III above and Table IV below were obtained as noted on 1/16″ diameter pellets of the molecular sieve. The pellet size does not appear to exert any controlling influence on the process and pellets of 1/8″ diameter have been employed with equal success. Larger size pellets should also be suitable.

It has been found that the present method will produce an effluent moisture dew point of at least −80° F., which is considered highly satisfactory for recycle of the hydrogen to a catalytic reformer. The following Table IV shows the breakthrough loadings and the effluent dew points produced by zeolite 4A when drying low and high relative humidity gas streams at 25 and 100° C. The zeolite was activated before use by heating to 440° C. and purging with dry air. The adsorptive stroke is terminated at or before breakthrough of the water adsorption front which can reliably be −80° F. dew point.

*Table IV*

| Temperature | 26° C. | 25° C. | 100° C. |
|---|---|---|---|
| Relative Humidity | 80% | 7% | 2.3% |
| Linear Velocity ft/sec. | 0.67 | 1.9 | 0.65 |
| Effluent Dew Point | −96° F. | −100° F. | −96° F. |
| Break-Through Loading (lbs. $H_2O$ lbs. adsorbent) | 16.4 | 18.5 | 10.5 |

The effectiveness of the present zeolitic molecular sieves in achieving the desired low effluent dew point during the adsorption stroke is dependent upon the completeness of the desorption effected. The present invention contemplates a method for continuously purifying a reformer recycle hydrogen gas stream in which at least two beds of the aforedescribed crystalline zeolitic molecular sieve material are provided. The impurity-laden reformer hydrogen feed gas stream is contacted with a first bed as an adsorption stroke at a pressure of at least 200 p.s.i. and a temperature below 150° F. As a desorption stroke, a second bed is heated to a temperature between 350° F. and 600° F., such bed having previously been loaded with moisture and possibly sulfur-containing compounds adsorbed from the reformer hydrogen gas stream. The desorbed impurities are then purged from the heated second bed by passing a heated purge gas at low pressure therethrough. Finally, the purged second bed is recooled and repressurized by passing at least part of the impurity-depleted reformer hydrogen gas stream therethrough. The flows between the first and second zeolitic molecular sieve beds are periodically switched so that the first bed is on a desorption stroke and the second bed is on adsorption stroke.

If the adsorbent is not heated to 350° F., the desorption will not be adequate to insure the desired effluent dew point on the following adsorption stroke. Temperatures above 600° F. tend to cause buildup of carbonaceous residues in the adsorbent and loss of capacity thereby with likelihood of hydrolytic damage in the event that a high water content purge gas is employed. Temperatures between 450° F. and 550° F. are preferred to minimize the volume of purge gas required as well as the coking and hydrolytic degradation.

The heatup is preferably effected by heating a portion of the impurity-containing reformer feed hydrogen to 550°–600° F. and then passing the heated gas through the adsorbent bed. The direction of flow is preferably opposite to that which was employed for the adsorption stroke so as to effect greater warmup and more complete desorption of the adsorption stroke discharge end of the bed. Also, the heatup step is preferably conducted at approximately the same pressure as was the adsorption stroke since this provides a lower linear velocity for a given mass flow than if a lower pressure were employed. The heatup gas leaving the adsorbent bed may be conveniently reduced in pressure and used as the fuel for the heater.

In the preferred method of desorption, after the adsorbent bed has reached the desired warmup temperature, the pressure is relieved to less than 5 atmospheres and purging continued with the same heated gas stream until reactivation is complete. Under these conditions, reactivation will be adequate to subsequently produce a −80° F. dew point effluent if at least 8 pound-moles of purge gas is employed for each 100 lbs. of adsorbent. Following reactivation, the desorbed bed is cooled and repressurized, using some of the purified reformer hydrogen gas from the adsorption stroke being conducted in the alternate zeolite bed.

The previously described adsorption-desorption conditions are equally suitable to the sweetening and drying of reformer hydrogen as to the drying of reformer hydrogen, the only difference being that when it is desired to remove $H_2S$, the adsorption stroke is terminated at $H_2S$ breakthrough, which may be taken as 0.02 grain per 100 s.c.f. This is because the $H_2S$ is less strongly adsorbed than the $H_2O$ at the concentrations encountered in reformer hydrogen and as a result, the $H_2S$ adsorption zone will precede the $H_2O$ adsorption zone.

Figure 3:
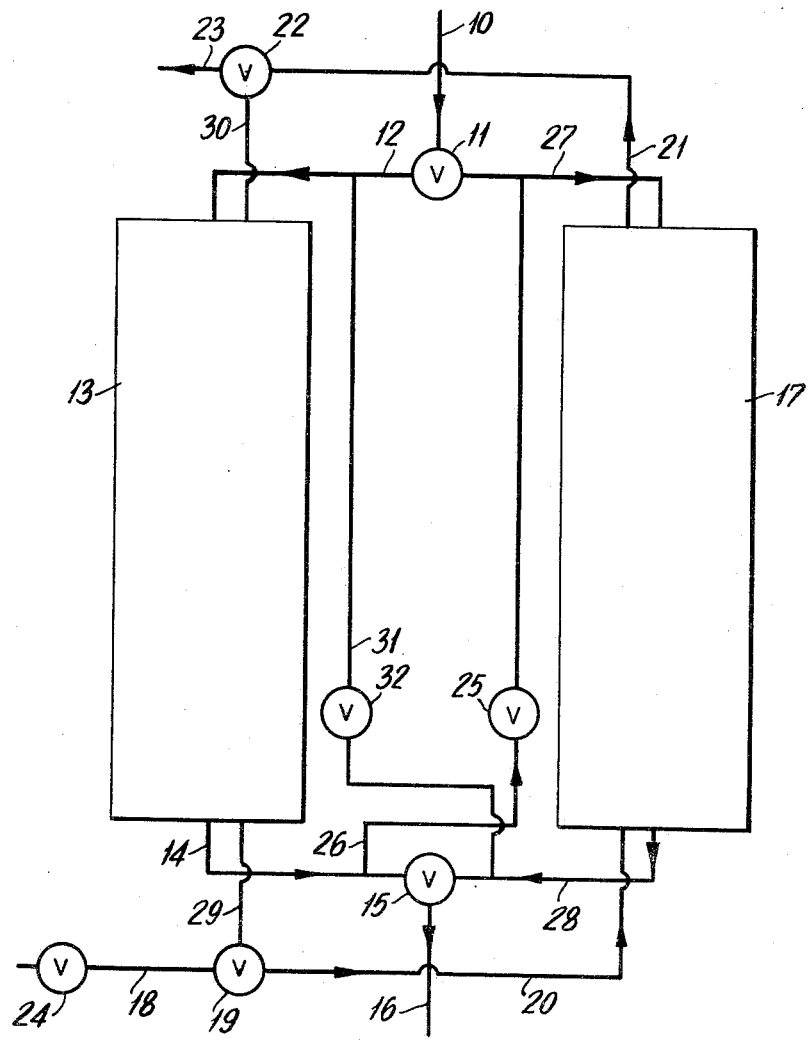
FIG. 3 is a schematic flowsheet of a system for continuously purifying reformer hydrogen, according to the present invention.

FIG. 3 illustrates a preferred system for continuously purifying reformer recycle hydrogen according to the present invention. The impurity-containing inlet stream is introduced through conduit 10 and three-way control valve 11 therein for flow through branch conduit 12 to the first zeolite molecular sieve bed 13, which for example may be on adsorption stroke. The impurities are deposited from the feed stream in bed 13 and an impurity depleted reformer hydrogen gas stream is discharged therefrom into conduit 14. At least part of the last-mentioned stream is then passed through three-way control valve 15 and communicating discharge conduit 16 for subsequent use as desired, such as recycling to the reformer unit or for ammonia synthesis.

During the period when zeolite molecular sieve bed 13 is on adsorption stroke, a second bed 17 is on desorption stroke so that a continuous supply of purified reformer hydrogen gas will be available. During the first phase of the desorption stroke, heated impurity-laden reformer hydrogen gas is introduced through conduit 18 and three-way control valve 19 therein for flow through communicating conduit 20 to second zeolite molecular sieve bed 17. The heated impurity-laden stream simultaneously heats and purges second bed 17 of the impurities deposited therein during the previous adsorption stroke. As previously discussed, the purge gas preferably flows in a direction opposite to that employed for the feed gas during the adsorption stroke so as to effect greater heatup and more complete desorption of the effluent end of the bed since the effectiveness of the purification of the product gas is largely controlled by the degree of desorption of that end of the bed. The purge gas is discharged from second bed 17 into conduit 21 for flow through three-way inlet valve 22 to discharge conduit 23 for further processing as desired. The spent purge gas stream may, for example, be conducted to the plant fuel system for recovery of its heating value.

During the heating phase of the desorption stroke, the heated gas preferably passes through the impurity-laden adsorbent bed at about the same pressure as that employed during the adsorption stroke. During the purging phase of the desorption stroke, the purge gas is preferably throttled through valve 24 to a substantially lower pressure resulting in the removal of a proportionately greater quantity of desorbate per unit mass of purge gas.

Following the heating and purging phases of the desorption stroke which, for example, may be for a predetermined time interval, three-way valves 19 and 22 are closed entirely, terminating flow of the heated impurity-laden reformer hydrogen gas stream. Simultaneously, the ports of three-way valve 15 are reused and control valve 25 in branch conduit 26 is opened so as to permit flow of the purified reformer hydrogen gas from discharge conduit 14 through branch conduit 26 and valve 25 to the feed gas inlet end of second adsorbent bed 17. This relatively cool gas flows through communicating conduit 27 to bed 17 for passage therethrough, preferably in the same direction as the feed gas during the adsorption stroke. This is to minimize shifting of the bed during repressurization. The warmed impurity-depleted reformer hydrogen gas is discharged from second bed 17 into conduit 28 after recooling such bed, and directed through three-way valve 15 to discharge conduit 16.

When the first adsorbent bed 13 becomes loaded with impurities and the regenerated second adsorbent bed 17 has been completely cooled down, the flows are switched so that first bed 13 is placed on desorption stroke and second bed 17 is placed on adsorption stroke. This is accomplished by reversing the ports of three-way valves 11 and 15 so that the feed gas entering conduit 10 flows through branch conduit 27, second bed 17, discharge conduit 28, three-way valve 15 and thence to discharge conduit 16 as impurity-depleted reformer hydrogen gas. Simultaneously, the ports of three-way valves 19 and 22 are reversed so that the heated impurity-containing reformer hydrogen stream is directed from conduit 18 through three-way valve 19 and communicating conduit 29 to first bed 13, and thence through conduit 30 to three-way valve 22 for discharge through conduit 23.

During the cooldown phase of the desorption stroke, impurity-depleted reformer hydrogen discharged from the second zeolite molecular sieve bed 17 is diverted from conduit 28 through communicating conduit 31 and control valve 32 therein to conduit 12 for passage through first bed 13 for cooldown and repressurization of such bed. After cooldown has been effected, the bed may be isolated until the alternate bed has completed its adsorption stroke, thus conducting the adsorption stroke to the full capacity of the adsorbent.

Although preferred embodiments of the invention have been described in detail, it is contemplated that modifications of the method may be made and that some features may be employed without others, all within the spirit and scope of the invention. For example, instead of effecting the warmup of the zeolitic molecular sieve bed by passing heated gas directly therethrough, such warmup could alternatively be obtained by passage of a heated fluid through coils embedded in the adsorbent beds. This arrangement would have the advantage of avoiding impurity contamination of the warmup gas, and the disadvantage of the added investment by virtue of the coils.

This is a continuation-in-part application of copending application Serial No. 400,385, filed December 24, 1953 in the name of R. M. Milton, now abandoned.

What is claimed is:

1. A method for purifying a moisture-containing reformer recycle hydrogen gas stream comprising the steps of providing a bed of crystalline zeolitic molecular sieve material having pore sizes sufficiently large to admit moisture molecules into the sieve and less than about 4 angstroms; providing a moisture-containing reformer hydrogen gas stream and contacting such stream with the zeolitic molecular sieve bed, thereby absorbing at least most of said moisture; and discharging a moisture-depleted reformer hydrogen gas stream from such bed.

2. A method according to claim 1 in which the zeolite is sodium zeolite A.

3. A method according to claim 1 in which the moisture-containing reformer hydrogen gas stream is contacted with the zeolitic molecular sieve bed at a pressure of at least 200 p.s.i.g.

4. A method according to claim 1 in which the moisture-containing reformer hydrogen gas stream is contacted with the zeolitic molecular sieve bed at a temperature below 150° F.

5. A method according to claim 1 in which the superficial linear velocity of the reformer hydrogen gas stream passing through the zeolitic molecular sieve bed is less than about 1.5 feet per second.

6. A method according to claim 1, in which the reformer hydrogen gas stream also contains a sulfur-containing compound as an impurity, the crystalline zeolitic molecular sieve has pore sizes between about 3.6 and 4.0 angstroms, and said sulfur-containing compound is simultaneously adsorbed with said moisture during contact with said zeolitic molecular sieve bed.

7. A method according to claim 6 in which the zeolite is a member selected from the group consisting of the naturally occurring crystalline molecular sieves mordenite, gmelinite, chabazite and erionite, and the synthetic crystalline zeolitic molecular sieves A, D, R, S and T.

8. A method according to claim 6 in which the zeolite is sodium zeolite A.

9. A method for purifying a moisture and sulfur compound-containing reformer recycle hydrogen gas stream comprising the steps of providing a bed of crystalline zeolitic molecular sieve material having pore sizes between about 3.6 and 4.0 angstroms; providing a moisture and sulfur compound-containing reformer hydrogen gas stream and contacting such stream with the zeolitic molecular sieve bed at a pressure of at least 200 p.s.i.g., a superficial linear velocity of less than about 1.5 feet per second and a temperature below 150° F. thereby adsorbing at least most of said moisture and sulfur compound; and discharging an impurity-depleted reformer hydrogen gas stream from such bed.

10. A method for continuously purifying a moisture-containing reformer recycle hydrogen gas stream comprising the steps of providing at least two beds of crystalline zeolitic molecular sieve material having pore sizes sufficiently large to admit moisture molecules into the sieve and less than about 4 angstroms; providing a moisture-containing reformer hydrogen gas inlet stream and as an adsorption stroke, contacting such stream with a first zeolitic molecular sieve bed at a pressure of at least 200 p.s.i.g., a superficial linear velocity of less than about 1.5 feet per second, and a temperature below 150° F. thereby adsorbing at least most of said moisture; discharging a moisture-depleted reformer hydrogen gas stream from such bed; as a desorption stroke, heating a second zeolitic molecular sieve bed to a temperature between 350° F. and 600° F., such second bed having previously been loaded with moisture adsorbed from said reformer hydrogen gas stream, purging the desorbed moisture from the heated second bed by passing a heated purge gas therethrough, and thereafter recooling the purged second bed by passing at least part of said moisture-depleted reformer hydrogen gas stream therethrough; periodically switching the flows between said first and second zeolitic molecular sieve beds so that the first bed is on desorption stroke and the second bed is on adsorption stroke.

11. A method according to claim 10, in which the zeolitic molecular sieve beds are heated to a temperature between 450° F. and 550° F. during said desorption stroke.

12. A method according to claim 10 in which part of said moisture-containing reformer hydrogen gas stream is heated and passed through said second bed at a pressure of at least 200 p.s.i.g. as the heating phase of said desorption stroke, and thereafter the heated moisture-containing gas stream is throttled to a pressure below 5 atmospheres and passed through said second bed as said heated purge gas.

13. A method according to claim 12, in which at least 8 pound-moles of heated, moisture-containing reformer hydrogen gas stream per 100 pounds of zeolitic molecular sieve adsorbent are passed through said second bed during the purging phase of said desorption stroke.

14. A method according to claim 12 in which the reformer hydrogen gas stream also contains a sulfur-containing compound as an impurity, the crystalline zeolitic molecular sieve has pore sizes between about 3.6 and 4.0 angstroms, the sulfur-containing compound is simultaneously adsorbed with said moisture during said adsorption stroke, and such stroke is continued until the equivalent $H_2S$ concentration in the impurity-depleted reformer hydrogen gas stream discharged from said first bed is about 0.02 gram per 100 s.c.f.

15. A method according to claim 10 in which said heated purge gas is passed through said second zeolitic molecular sieve bed in a direction countercurrent to that of the previously passed reformer hydrogen inlet gas stream during the adsorption stroke.

16. A method according to claim 10 in which said moisture-depleted reformer hydrogen gas stream is passed through the purged second bed in a direction cocurrent to that of the previously passed reformer hydrogen inlet gas stream during the adsorption stroke.

17. A method according to claim 10 in which said heated purge gas is passed through said second zeolitic molecular sieve bed in a direction countercurrent to that of the previously passed reformer hydrogen inlet gas stream during the adsorption stroke, and said moisture-depleted reformer hydrogen gas stream is passed through the purged second bed in a direction cocurrent to that of the previously passed reformer hydrogen inlet gas stream during the adsorption stroke.

18. A method according to claim 1 in which the zeolite is a member selected from the group consisting of the naturally occurring crystalline molecular sieves erionite, chabazite, gmelinite, mordenite, analcite, harmatome and phillipsite, and the synthetic crystalline zeolitic molecular sieves A, D, R, S, T, F, M, J, and H.

References Cited in the file of this patent
UNITED STATES PATENTS

| | | |
|---|---|---|
| 2,522,426 | Black | Sept. 12, 1950 |
| 2,699,837 | Van Note | Jan. 18, 1955 |
| 2,747,681 | Schuftan et al. | May 29, 1956 |
| 2,765,868 | Parks | Oct. 9, 1956 |
| 2,880,818 | Dow | Apr. 7, 1959 |

OTHER REFERENCES

Occlusion of Hydrocarbons by Chabazite and Analcite, by R. M. Barrer et al., Transactions of the Faraday Society (London), vol. 40, (1944), page 202.

Examine These Ways to Use Selective Adsorption, Petroleum Refiner, vol. 36, No. 7, July 1957, pages 136–140.